United States Patent
Lu

(10) Patent No.: US 8,993,076 B2
(45) Date of Patent: Mar. 31, 2015

(54) LIQUID CRYSTAL ADDITIVE, LIQUID CRYSTAL COMPOSITION AND LIQUID CRYSTAL PANEL THEREOF

(71) Applicant: Houng-Chieh Lu, Guangdong (CN)

(72) Inventor: Houng-Chieh Lu, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 87 days.

(21) Appl. No.: 13/703,409

(22) PCT Filed: Nov. 23, 2012

(86) PCT No.: PCT/CN2012/085174
§ 371 (c)(1),
(2) Date: Dec. 11, 2012

(87) PCT Pub. No.: WO2014/075334
PCT Pub. Date: May 22, 2014

(65) Prior Publication Data
US 2014/0178607 A1  Jun. 26, 2014

(30) Foreign Application Priority Data
Nov. 15, 2012  (CN) .......................... 2012 1 0457772

(51) Int. Cl.
| C09K 19/00 | (2006.01) |
| C09K 19/54 | (2006.01) |
| C09K 19/40 | (2006.01) |
| C09K 19/56 | (2006.01) |
| C09K 19/04 | (2006.01) |
| C09K 19/12 | (2006.01) |

(52) U.S. Cl.
CPC ............... *C09K 19/54* (2013.01); *C09K 19/406* (2013.01); *C09K 19/56* (2013.01); *C09K 2019/0448* (2013.01); *C09K 2019/122* (2013.01)
USPC .......... 428/1.52; 349/178; 349/191; 556/465; 556/489; 252/299.01; 252/299.4; 252/299.5; 252/299.63; 252/299.66

(58) Field of Classification Search
CPC ...... C09K 19/406; C09K 19/10; C09K 19/12; C09K 19/3098; C09K 19/44; C09K 19/56
USPC .......... 428/1.52; 349/178, 186, 191; 556/465, 556/489; 252/299.01, 299.4, 299.5, 299.63, 252/299.65, 299.66
See application file for complete search history.

(56) References Cited

U.S. PATENT DOCUMENTS

| 2004/0006235 A1 | 1/2004 | Pauluth et al. |
| 2006/0151743 A1 | 7/2006 | Cheong et al. |
| 2007/0228328 A1 | 10/2007 | Lietzau et al. |

FOREIGN PATENT DOCUMENTS

| CN | 1947054 A | 4/2007 |
| CN | 101090954 A | 12/2007 |

*Primary Examiner* — Gwendolyn Blackwell
*Assistant Examiner* — Ruiyun Zhang
(74) *Attorney, Agent, or Firm* — Kirton McConkie; Evan R. Witt

(57) ABSTRACT

The present invention provides a liquid crystal additive, a liquid crystal composition and a liquid crystal panel thereof. The liquid crystal additive of the present invention has a higher clear point, so that adding the liquid crystal additive into a liquid crystal composition of a liquid crystal panel can omit the process of forming alignment films to reduce manufacturing costs and time of liquid crystal panels; meanwhile, the MURA phenomenon due to the different effects of liquid crystal molecules and liquid crystal reactive monomers on alignment films is avoided, so as to improve the uniformity of liquid crystal panel.

6 Claims, 1 Drawing Sheet

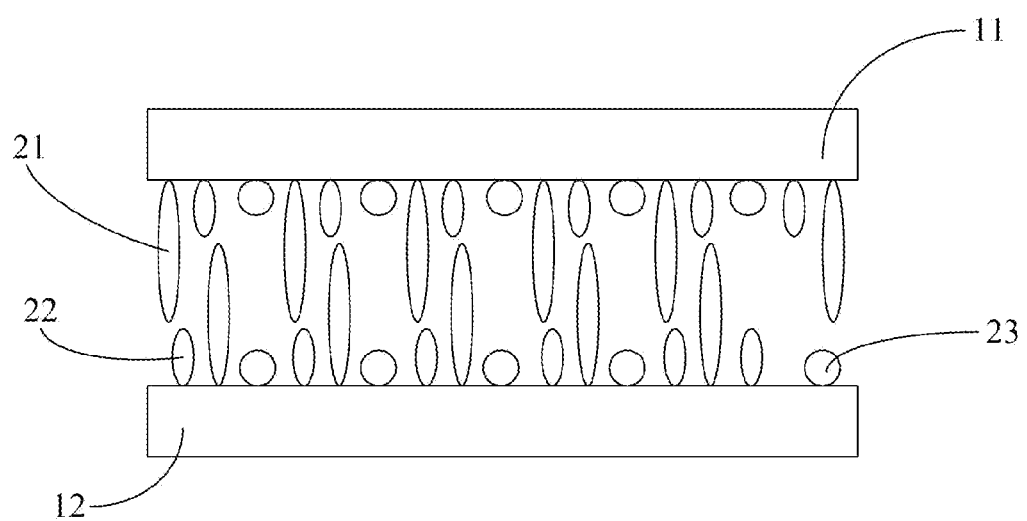

LIQUID CRYSTAL ADDITIVE, LIQUID CRYSTAL COMPOSITION AND LIQUID CRYSTAL PANEL THEREOF

FIELD OF THE INVENTION

The present invention relates to a liquid crystal additive and a liquid crystal panel, especially relates to a liquid crystal additive introduced benzene ring or cyclohexyl, a liquid crystal composition comprising the liquid crystal additive and a liquid crystal panel.

BACKGROUND OF THE INVENTION

Liquid crystal display (LCD) is a flat panel display device using the characteristics of the liquid crystal materials to display images which has many advantages, such as light-weight, low driving voltage and low power consumption, and has becoming the mainstream products in the whole consumer market.

Liquid crystal panel is the most important component of the LCD which contains a thin film transistor (TFT) array substrate and a color filter (CF) substrate that are laminated in vacuum, a liquid-crystal layer and alignment films filled between them. The alignment films are equipped on the TFT array substrate and/or CF substrate to control the predetermined initial arrangement of liquid crystal molecules of the liquid-crystal layer in order to influence the performance of the liquid crystal panel.

The manufacturing process of liquid crystal panels is mainly divided into three parts: array process, cell process and module assembly process. A TFT substrate and a CF substrate are provided in the array process, and the TFT substrate and CF substrate are laminated in vacuum while a liquid-crystal layer and alignment films filled between them in the cell process. The module assembly process is a production process in which a liquid crystal cell obtained after the cell process is assembled with various components such as backlight plate, circuit, frame, etc.

The cell process generally is: an alignment film is formed on the TFT substrate and CF substrate respectively, then liquid crystal compositions are dropped on the substrates by one-drop filling technology (ODF), and lastly, the two substrates are laminated in vacuum followed by UV curing process. One method to form alignment films is to coat alignment materials on the inner surface of the TFT substrate and CF substrate while manufacturing the TFT substrate and CF substrate. In this method, static electricity and impurities carried on a brush for coating are generated easily to cause damages to a liquid crystal panel. Meanwhile, special devices and time required for forming alignment films and high costs of alignment materials remind the manufacturing costs of liquid crystal panels high. Moreover, a MURA phenomenon is caused due to different effects of liquid crystal molecules and liquid crystal reactive monomers on alignment films contained in liquid crystal compositions.

As a result, it is necessary to provide a new monomer to solve the problems existing in the conventional technologies.

SUMMARY OF THE INVENTION

The first object of the present invention is to provide a liquid crystal additive having a higher clear point, so that process of forming alignment films can be omitted to solve MURA issue and reduce manufacturing costs of liquid crystal panels.

To achieve the above object, the present invention provides a liquid crystal additive included in a liquid crystal composition, which is represented by the following formula (I) or (II):

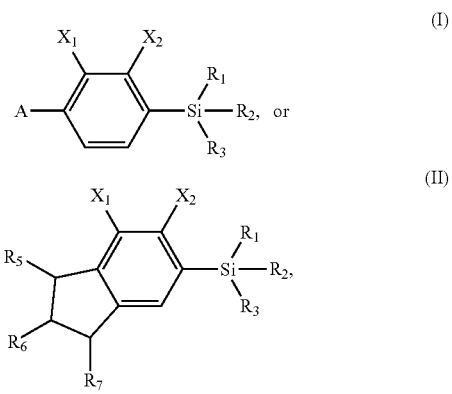

wherein
group A has at least one benzene ring or cyclohexyl;
$R_1$, $R_2$, $R_3$, $R_5$, $R_6$ and $R_7$ are same or different groups and are independently selected from alkyl group having 1-8 carbon atoms, alkenyl group having 2-8 carbon atoms or alkoxy group having 1-7 carbon atoms; and
$X_1$ and $X_2$ are same or different groups and are independently selected from F or Cl.

In one embodiment of the present invention, the group A is represented by any one of the following formula (i)-(iv):

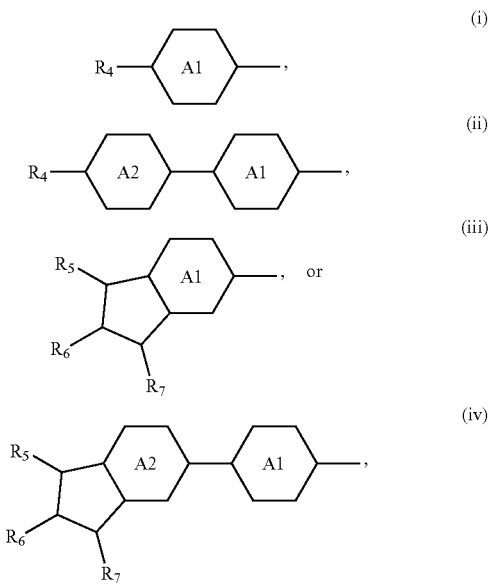

wherein
group A1 and A2 are same or different groups and are selected from benzene ring or cyclohexyl;
$R_4$, $R_5$, $R_6$ and $R_7$ are same or different groups and are independently selected from alkyl group having 1-8 carbon atoms, alkenyl group having 2-8 carbon atoms or alkoxy group having 1-7 carbon atoms.

The present invention is also to provide a liquid crystal composition for manufacturing a liquid crystal panel, which comprises: at least one type of the liquid crystal additive mentioned above; at least one type of liquid crystal molecule; and at least one type of liquid crystal reactive monomer.

In one embodiment of the present invention, the liquid crystal composition is a liquid crystal composition of one-drop filling technology.

The present invention is also to provide a liquid crystal panel comprising a first substrate, a second substrate, and a liquid crystal composition dispersed and distributed between the first substrate and the second substrate, the liquid crystal composition contains at least one type of liquid crystal molecule, at least one type of liquid crystal reactive monomer and at least one type of the liquid crystal additive mentioned above.

In one embodiment of the present invention, the first substrate is a color filter substrate and the second substrate is a thin film transistor array substrate.

In one embodiment of the present invention, the liquid crystal composition is a liquid crystal composition of one-drop filling technology.

It should be noted that:

(1) the liquid crystal molecule or the liquid crystal reactive monomer in the present invention is a liquid crystal molecule or a liquid crystal reactive monomer that is already known in the art; and (2) the alkyl group having 1-8 carbon atoms means a straight-chain or a branched alkyl group which has 1 to 8 carbon atoms such as methyl, ethyl, n-propyl, isopropyl, n-butyl, isobutyl, tert-butyl, sec-butyl, n-amyl, isopentyl, neopentyl, n-hexyl, etc. Similarly, the alkenyl group having 2-8 carbon atoms means a straight-chain or a branched alkenyl group which has 2-8 carbon atoms and the alkoxy group having 1-7 carbon atoms means a straight-chain or a branched alkoxy group which has 1-7 carbon atoms.

The positive effect of the present invention is that:

(1) the process of forming alignment films is omitted to reduce manufacturing costs and time of liquid crystal panels; and (2) the MURA phenomenon due to the different effects of liquid crystal molecules and liquid crystal reactive monomers on alignment films is avoided to improve the uniformity of liquid crystal panel.

BRIEF DESCRIPTION OF THE DRAWINGS

FIG. 1 illustrates a liquid crystal panel and a liquid crystal composition thereof according to a preferred embodiment of the present invention;
wherein

| | |
|---|---|
| 11-first substrate; | 12-second substrate; |
| 21-liquid crystal molecule; | 22-liquid crystal reactive monomer; and |
| 23-liquid crystal additive. | |

DESCRIPTION OF THE INVENTION

Embodiments, for purposes of explanation, are set forth in order to provide a thorough understanding of the present invention and not to limit the technical solution of the present invention.

According to a preferred embodiment of the present invention, the present invention provides a liquid crystal additive included in a liquid crystal composition, which is represented by the following formula (v) to (ix):

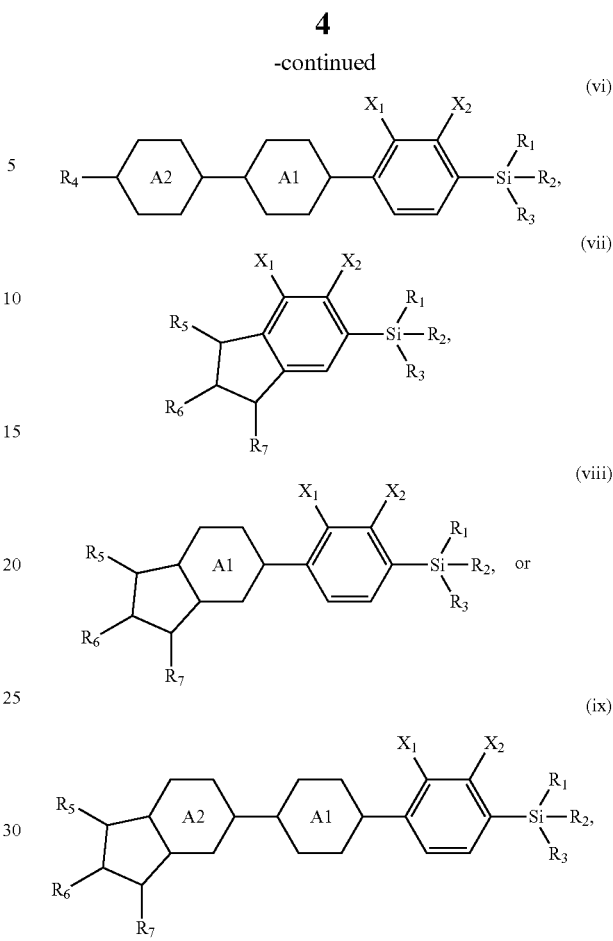

wherein
group A1 and A2 are same or different groups and are selected from benzene ring or cyclohexyl;
$X_1$ and $X_2$ are same or different groups and are selected from F or Cl;
$R_1, R_2, R_3, R_4, R_5, R_6$ and $R_7$ are same or different groups and are independently selected from alkyl group having 1-8 carbon atoms, alkenyl group having 2-8 carbon atoms or alkoxy group having 1-7 carbon atoms.

According to a preferred embodiment of the present invention, the present invention also provides a liquid crystal composition comprising: at least one type of the liquid crystal additive mentioned above; at least one type of liquid crystal molecule; and at least one type of liquid crystal reactive monomer. The liquid crystal molecule is a liquid crystal molecule already known in the art and need not be repeated here. The liquid crystal reactive monomer is a liquid crystal reactive monomer already known in the art and is represented by the following formula:

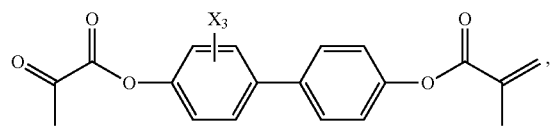

wherein $X_3$ is H or F.

As shown in FIG. 1, according to a preferred embodiment of the present invention, the present invention also provides a liquid crystal panel comprising a first substrate 11 and a second substrate 12, wherein the first substrate 11 is a color filter substrate and the second substrate 12 is a thin film transistor array substrate. A liquid crystal composition is dispersed and distributed between the first substrate and the second substrate, which contains at least one type of liquid crystal molecule 21, at least one type of liquid crystal reactive monomer 22 and at least one type of the liquid crystal additive 23 mentioned above. Difference between the manufacturing process of the liquid crystal panel and a convention liquid crystal panel is omitting the process of forming alignment films.

The liquid crystal additive the present invention provided has a higher clear point, so that process of forming alignment films can be omitted to reduce manufacturing costs and time of liquid crystal panels; meanwhile, the MURA phenomenon due to the different effects of liquid crystal molecules and liquid crystal reactive monomers on alignment films is avoided, so as to improve the uniformity of liquid crystal panel.

The present invention has been described with relative embodiments which are examples of the present invention only. It should be noted that the embodiments disclosed are not the limit of the scope of the present invention. Conversely, modifications to the scope and the spirit of the claims, as well as the equal of the claims, are within the scope of the present invention.

What is claimed is:

1. A liquid crystal additive, included in a liquid crystal composition, wherein the liquid crystal additive is represented by the following formula (I):

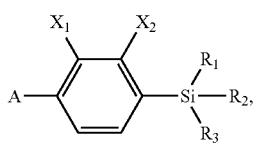

(I)

wherein
  group A is represented by the following formula (i) or (ii):

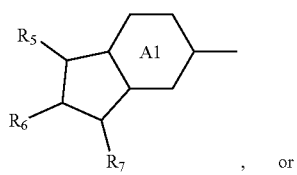

, or

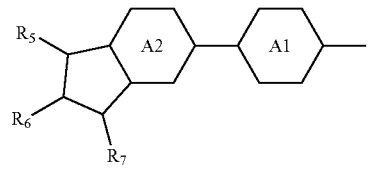

(ii)

wherein
  group A1 and A2 are same or different groups and are selected from benzene ring or cyclohexyl;
  $R_1$, $R_2$, $R_3$, $R_5$, $R_6$ and $R_7$ are same or different groups and are independently selected from alkyl group having 1-8 carbon atoms, alkenyl group having 2-8 carbon atoms or alkoxy group having 1-7 carbon atoms; and
  $X_1$ and $X_2$ are same or different groups and are independently selected from F or Cl.

2. A liquid crystal composition for manufacturing a liquid crystal panel, wherein the liquid crystal composition comprises:
  at least one type of the liquid crystal additive according to claim 1;
  at least one type of liquid crystal molecule; and
  at least one type of liquid crystal reactive monomer.

3. The liquid crystal composition according to claim 2, wherein the liquid crystal composition is a liquid crystal composition of one-drop filling technology.

4. A liquid crystal panel, comprising a first substrate and a second substrate, wherein a liquid crystal composition is dispersed and distributed between the first substrate and the second substrate, and the liquid crystal composition contains at least one type of liquid crystal molecule, at least one type of liquid crystal reactive monomer and at least one type of the liquid crystal additive according to claim 1.

5. The liquid crystal panel according to claim 4, wherein the first substrate is a color filter substrate, and the second substrate is a thin film transistor array substrate.

6. The liquid crystal panel according to claim 4, wherein the liquid crystal composition is a liquid crystal composition of one-drop filling technology.

\* \* \* \* \*